United States Patent
Brougham

(12) 
(10) Patent No.: US 6,332,475 B1
(45) Date of Patent: Dec. 25, 2001

(54) FILLING STOP VALVE

(75) Inventor: Peter Henry Brougham, Tumby Bay (AU)

(73) Assignee: Mastavalve Pty. Ltd., Fullarton ( * ) Notice: Subject to any disclaimer, the term of this patent is extended or adjusted under 35 U.S.C. 154(b) by 0 days.

(21) Appl. No.: 09/367,723

(22) PCT Filed: Feb. 23, 1998

(86) PCT No.: PCT/AU98/00113

§ 371 Date: Dec. 9, 1999

§ 102(e) Date: Dec. 9, 1999

(87) PCT Pub. No.: WO98/37348

PCT Pub. Date: Aug. 27, 1998

(30) Foreign Application Priority Data

Feb. 21, 1997 (AU) .................................................. PO5249

(51) Int. Cl.[7] ................................. F16K 31/34; B08B 9/04
(52) U.S. Cl. .................... 137/414; 137/423; 137/428; 137/430; 137/436; 137/244
(58) Field of Search .................... 137/218, 413, 137/414, 415, 428, 430, 433, 435, 436, 437, 244, 423

(56) References Cited

U.S. PATENT DOCUMENTS

| | | | |
|---|---|---|---|
| 2,252,078 | * | 8/1941 | Kohlmeyer .............................. 137/436 |
| 2,253,304 | * | 3/1941 | Toussaint ................................. 251/45 |
| 2,324,084 | * | 7/1943 | Horner ................................... 137/218 |
| 2,328,323 | * | 8/1943 | Bowers et al. .......................... 137/414 |
| 2,382,500 | * | 8/1945 | Owens .................................... 137/437 |
| 2,407,761 | * | 9/1946 | McPherson .............................. 251/46 |
| 2,409,890 | * | 10/1946 | Owens .................................... 137/414 |
| 2,491,521 | * | 12/1949 | Samiran ................................. 137/414 |
| 2,578,745 | * | 12/1951 | Samiran ................................. 137/414 |
| 2,588,242 | * | 3/1952 | Hunter ................................... 137/414 |
| 2,619,122 | * | 11/1952 | Hunter ................................... 137/436 |
| 2,698,631 | * | 1/1955 | Bashark ................................. 137/414 |
| 2,777,460 | * | 1/1957 | Svirsky ................................... 137/218 |
| 2,781,772 | * | 2/1957 | Russell .................................. 137/414 |
| 3,171,424 | * | 3/1965 | Shames et al. ......................... 137/435 |
| 3,194,258 | * | 7/1965 | Grant ..................................... 137/414 |
| 3,693,649 | * | 9/1972 | Gordon et al. ......................... 137/414 |
| 4,094,327 | | 6/1978 | Brandelli .............................. 137/403 |
| 4,295,488 | * | 10/1981 | Book ...................................... 138/414 |
| 4,566,484 | | 1/1986 | Silverman ............................. 137/403 |
| 4,945,944 | | 8/1990 | Chen ..................................... 137/403 |
| 5,829,465 | * | 11/1998 | Garretson ................................. 137/2 |

FOREIGN PATENT DOCUMENTS

| | | | |
|---|---|---|---|
| 28492/95 | | 10/1995 | (AU) . |
| 297 05 703 | | 7/1997 | (DE) . |
| 1 505 097 | | 3/1978 | (GB) . |
| 2039345 A | * | 8/1980 | (GB) ................................... 137/218 |

* cited by examiner

*Primary Examiner*—George L. Walton
(74) *Attorney, Agent, or Firm*—Finnegan, Henderson, Farabow, Garrett & Dunner, L.L.P.

(57) ABSTRACT

A stop valve to terminate flow of liquid there through when the level of the liquid reaches a desired level in a container. The stop valve includes a master diaphragm valve (38) to regulate the flow of liquid through the valve and a pilot diaphragm valve (10) controlling the master valve. The pilot diaphragm valve (10) is subject to the position of a float (37) on the liquid in the container.

11 Claims, 3 Drawing Sheets

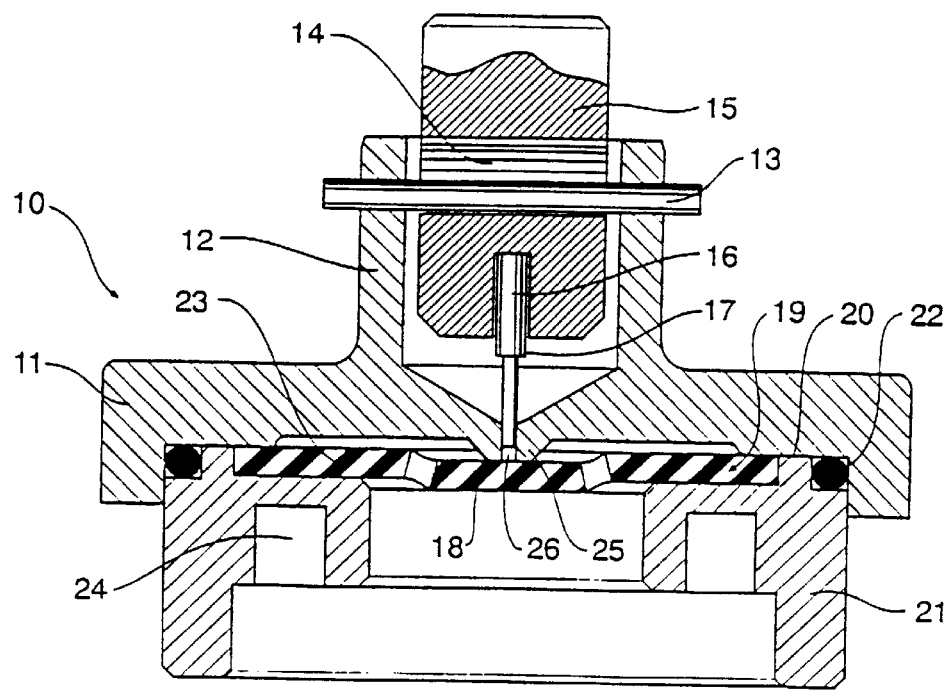
*FIG 2a*
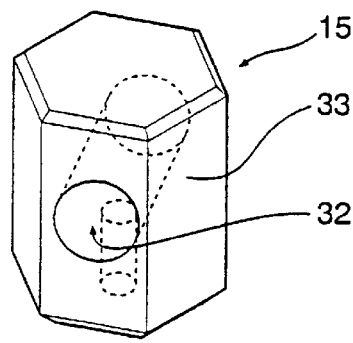
*FIG 2b*
*FIG 2c*
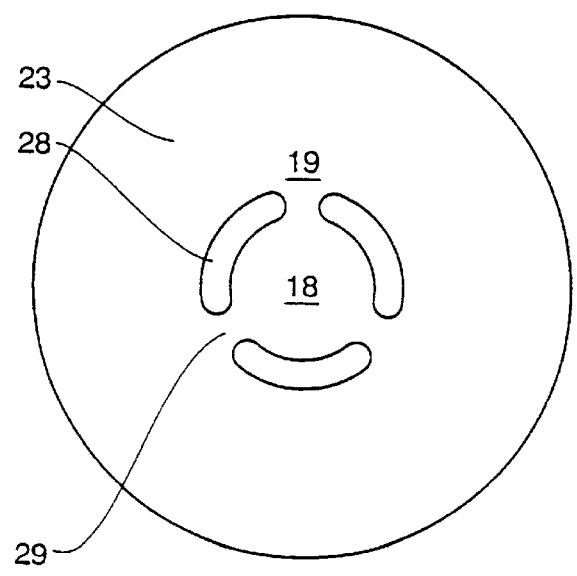
*FIG 2d*

FILLING STOP VALVE

TECHNICAL FIELD

This invention relates to a filling stop valve, particularly to the automatic cut off of flow of liquid when the liquid reaches a desired level.

BACKGROUND ART

Float valves are well known to cut off the flow of liquid when a desired level of the liquid has been reached in a container. The simplest form of such a valve comprises a float on an end of an arm pivoted to the body of the valve, the other end of the arm pressing on a valve member to close an aperture in an inlet pipe. The float arm is of a length such that the required pressure can be applied to the valve to close against the inlet liquid pressure In order to obtain further control of the liquid flow and obtain the desired cut off of the flow, servo valves are known, in which a pilot valve controls the operation of a master valve by the application of liquid pressure to assist in the operation of the master valve. The use of a servo valve thus eliminates or reduces the length of the float arm, the servo valve incorporating a diaphragm as the master valve or connected to the master valve.

One example of a diaphragm valve given in AU 659356 in which a sensing or pilot diaphragm has attached thereto a ring magnet. A further magnet is attached to a plunger which is adapted to open and close an aperture in the diaphragm of the master valve.

Various other patent specifications, such as U.S. Pat. Nos. 3,994,313; 4,013,091; 4,977,923; 5,067,516; and 4,027,693; which show servo valves having a diaphragm valve as the master valve which is controlled by a servo valve comprising a solid or mechanical valve controlled by a float valve or other liquid level sensing means.

It is an object of this invention to provide a stop valve in which a smaller force is required to operate the pilot valve, and in turn achieving more precise control of the liquid level in a container such as a cistern or fuel tank or container containing corrosive or other pollutant fluids.

A further object of the invention is to provide a stop valve which is less liable to malfunction due to pollutants in the liquid.

A still further object of the invention is to provide a stop valve having means to reduce or eliminate liquid surge and water hammer in the liquid supply line.

DISCLOSURE OF THE INVENTION

In order to overcome one or more of the above objects, there is provided according to the invention a stop valve to terminate the flow of liquid on the liquid reaching a certain level, said stop valve comprising a master valve to control the flow of liquid, said master valve being controlled by a diaphragm valve controlled by a float or other liquid level sensing device in contact with the liquid.

BRIEF DESCRIPTION OF THE DRAWINGS

In order to more fully describe the invention reference will now be made to the accompanying drawings in which.

PRIOR ART illustrates one form of valve operated electromagnetically.

BEST MODE FOR CARRYING OUT THE INVENTION

Reference is first made to the prior art drawing shown. In the prior art drawing, there is no master valve diaphragm, but a plunger is electro-mechanically operated to open or close an aperture which is central in a thick diaphragm, and when open it allows water to flow to pass through bleed holes in the diaphragm, and past the central plunger. Such an arrangement is in common use, is quite reliable, but requires electrical power to control the plunger.

Figure 1:
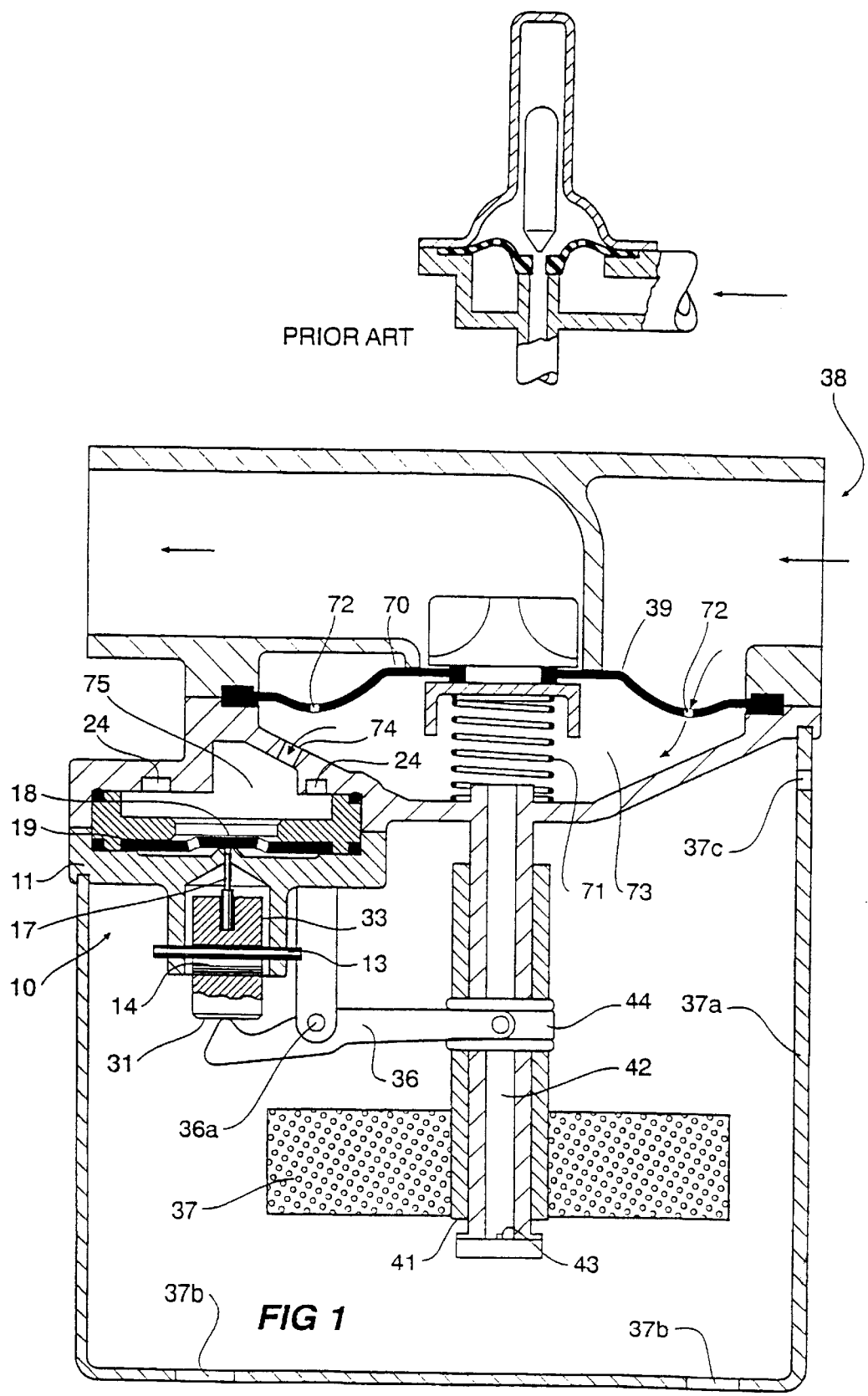
FIG. 1 illustrates an embodiment wherein the diaphragm pilot valve controls a diaphragm master valve, FIGS. 2a, 2b, 2c & 2d respectively assembly illustrate the pilot valve, the push rod, and the diaphragm configuration.

The embodiment of FIGS. 1 and 2 however, is intended for more accurate control of a master valve by means of a small pilot valve. While the embodiment described shows a diaphragm valve as the master valve, it is to be realised that the master valve can be a piston type valve.

Reference is made particularly to FIGS. 2a, 2b, 2c, and 2d, in which FIG. 2a illustrates a pilot valve 10 which has a valve body 11, the body having an upstanding circular flange 12 which contains a retaining pin 13 extending through an aperture 14 in an abutment member 15. The abutment member 15 contains an axially orientated aperture 16 which houses the upper end of a push rod 17, the push rod bearing on the central closure zone 18 of the pilot valve diaphragm 19. The diaphragm 19 is clamped against face 20 via a retaining block 21, retaining block 21 being sealed by an O-ring 22 to the valve body 11. The retaining block 21 also locates the outer annulus 23 of the diaphragm against the face 20 of the body 11. Retaining block 21 contains recesses 24 to provide air pockets or cavities which can act as shock absorbers to slow valve action, reducing the possibility of water hammer. The pockets or cavities thus contain air or other compressible material, whereby the air or compressible material act to cushion the liquid thus reducing or eliminating water hammer and surging of the liquid.

The push rod 17 passes through bleed aperture 26 in the face 20 of the body 11. The diameter of the bleed aperture 26 is preferably small whereby small forces are used to deflect the closure zone 18 away from its valve seat 25 at the end of the aperture 26, and to inhibit development of leaks particularly as the valve closes. The configuration is such that the closure zone is deflected against the resilience of the material of which the diaphragm is made thereby providing a small degree of preloading upwardly as shown in FIG. 2a with the diaphragm against its seat 25. In order to ensure the optimum available conditions, there are provided three part-circular apertures 28 (FIG. 2d) which define between them three connecting bridges 29 so that the loading will be concentric, and is unlikely to be eccentric, reducing thereby the likelihood of leakage.

It will be noted that in FIG. 1, instead of the abutment member 15 being slidable within limits over the retaining pin 13, as show in FIG. 2a, there is provided an abutment member 31 containing an aperture 14 having a diameter greater than the diameter of retaining pin 13 so that there is a limitation of the axial movement of push rod 17. The outer surface of the abutment member is not circular, and in this embodiment comprises a plurality of flat surfaces 33 which reduce the likelihood of debris build up interfering with the free functioning of the valve. Preferably the abutment member is hexagonal in cross section.

FIG. 1 illustrates the arrangement wherein use is made of a lever arm 36 pivoted at 36a to the pilot valve 10 which will multiply the force imparted by the ballasted float 37, thereby making it possible to use a relatively small ballasted float. The amount of movement required to sufficiently deflect the closure zone 18 of the diaphragm 19 is not great. The master valve 38 is illustrated as a large flow-through valve, closure of which is effected in this embodiment by a master diaphragm 39.

An outer casing 37a protects the float and surrounding mechanism, the casing having two orifices 37b to permit the entry of liquid and an orifice 37c which is open to atmosphere. The two orifices 37b are provided to regulate the entry of the liquid, into the casing, thus preventing surges in the liquid from effecting the operation of the float.

As illustrated, the float 37 is carried on a bush 41 which adds the ballast to the float, which slides over a stem 42, the stem 42 having spaced upstanding end stops 43 at its distal end. The stem 42 (or alternately the hole in the bush through which the stem 42 passes) is non-circular and preferably multi-faceted so as to provide facility of flushing of debris which may collect due to polluted water. The lever arm 36 pivots on a collar 44 which is rotatable with respect to the bush 41, and the bush 41 is rotatable and slidable with respect to stem 42 so that danger of malfunction due to eccentric loading is substantially avoided.

Referring to FIG. 1, the arrows indicate the direction of flow through the valve 38 with the diaphragm seating on the valve seat 70, the valve being biased to the closed position by the spring 71. The diaphragm has a bleed aperture 72 opening to chamber 73 in the housing of valve 38, and which is connected by further bleed aperture 74 to chamber 75 in the pilot valve 10.

In the position shown in FIG. 1, with the master valve in the closed position due to the float 37 being in an uppermost position indicating that the liquid level is such that the valve 38 be closed. In this position the central closure zone 18 of the valve of the pilot diaphragm 19 seals against seat 25, (as shown in FIG. 2a) so that inlet pressure cannot escape through aperture 26 (as shown in FIG. 2a), where by the inlet pressure on the closing side of diaphragm 39 plus spring pressure of spring 71 closes the master valve.

However when the liquid level falls, the lever 36 will raise the abutment member 31 raising the push rod 17 to thus raise the closing zone 18 of diaphragm 19 and lift it away from its seat 25. Thus a bleed of liquid can take place from the chamber 73 through bleed orifice 74, chamber 75, passages 28 in the diaphragm 19 and bleed 26 around the rod 17. Thus the pressure in the chamber 73 is reduced and the greater inlet pressure on the other side of diaphragm 39 will cause the master valve to open to permit liquid flow through the master valve. When the liquid rises raising float 37, the lever 36 pivots thus lowering abutment member 31 and rod 17 to thus permit the closing zone 18 of diaphragm 19 closing the bleed passage 26, whereby pressure will increase in chamber 73 thus causing the master valve to close.

Figure 3:
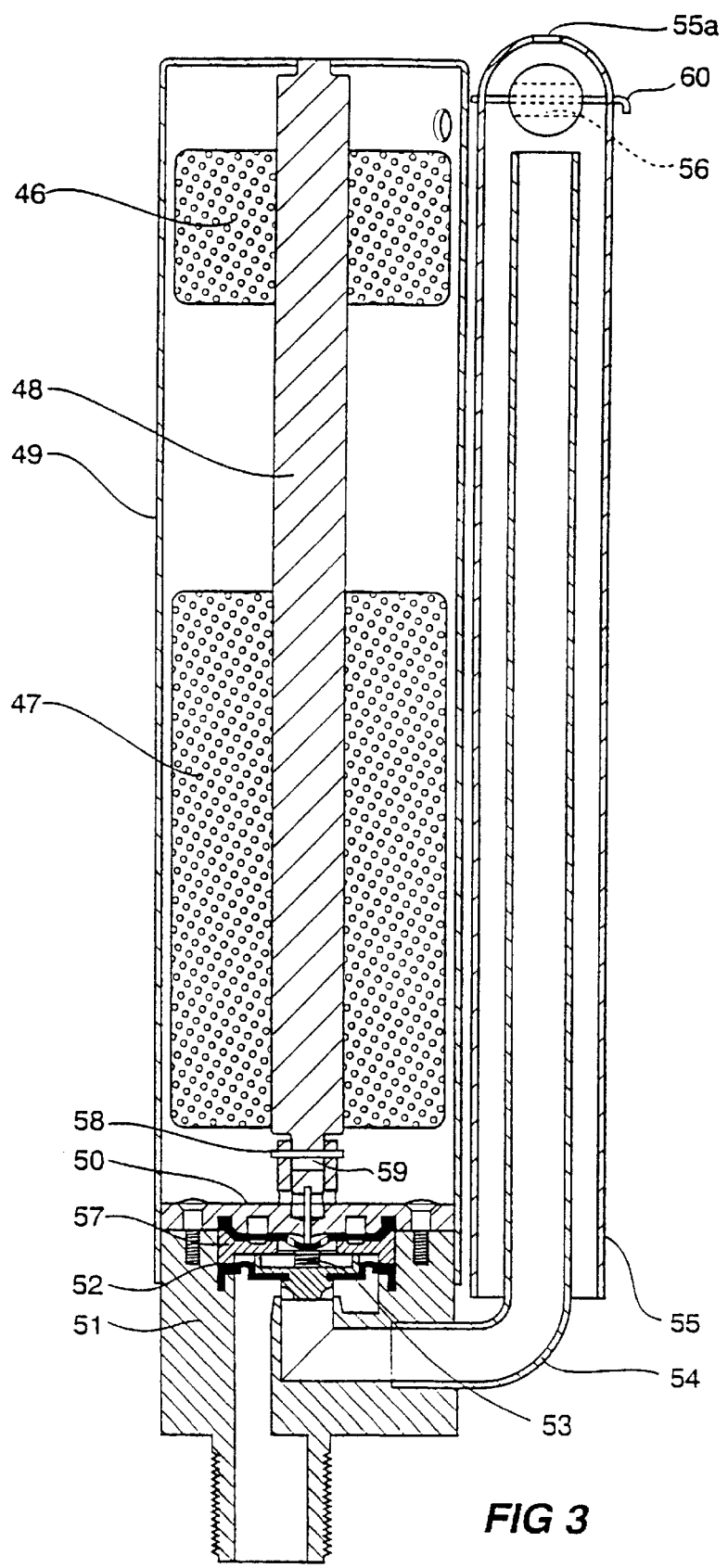
FIG. 3 illustrates a further embodiment arranged as a cistern valve.

Although small ballasted floats are required, FIG. 3 illustrates an embodiment where a high degree of flexibility is achieved by having a pair of floats 46 and 47 carried on a stem 48 (representing the ballast mass) and spaced vertically from one another within a cistern valve casing 49.

In the cistern valve 51, the pilot valve 50 is co-axial with the master diaphragm 52, and a light spring 53 between the master diaphragm and spacer 57 supplements the pressure bias across the master diaphragm. The outlet tube 54 extends upwardly within a deflector tube 55, and the upper end of the deflector tube contains an aperture 55a which inhibits the development of the siphon action. However upon water flow, a buoyant closure member 56 retained loosely on pin 60 can close the aperture so as to reduce introduction of air into the flushing water, which in turn will reduce noise. It can be noted that the retaining pin 58 is contained in large diameter aperture 59 in the lower end of the stem 48 and functions in the same way as illustrated in FIG. 2a.

In one prototype which was produced by the applicant, a valve functioned satisfactorily when a force of 1.7 Newtons was applied to the push rod to deflect the closure zone of the pilot valve and the push rod was moved by a distance of only one millimeter. Thus it can be seen that whether used with a single or double float arrangement in a cistern or other liquid level sensing valve, a pilot valve and master valve arrangement can be relatively small compared with a ball float and arm arrangement as is presently used in similar applications.

Thus it is seen that there is provided according to the invention a valve which will reliably function with a relatively small movement of the push rod which bears against the closure zone of the pilot valve, and a corresponding smaller force is required to be exerted thereon so that a relatively small float assembly may be used to actuate the pilot valve diaphragm resulting in a improved control over the water level, which may be in a cistern for example.

It is to be noted that the diaphragm of the pilot valve is provided with a plurality of equally spaced connecting bridges between the central closure zone of the of the diaphragm and the outer annulus so that the possibility of the diaphragm failing to seal due to imbalanced forces is substantially reduced. This may otherwise occur, for example if the water contains particulate material. Thus preferably the pilot valve contains at least three equally circumferentially spaced bridges 29, and thus the apertures 28 are equally spaced around the diaphragm. These apertures permit the flow of liquid, and any contaminants carried thereby, to pass freely through the diaphragm, which is an added advantage over a single bleed aperture in the diaphragm.

Thus a small diameter outlet in the valve seat of the pilot valve is provided, since the applied pressure will effect a closure force which is proportional to the outlet area, that in turn demands that the push rod should be small in diameter. In order to guard against the possibility of debris forming on the outer surfaces of the push rod, in an embodiment the push rod member is multi-faceted on its outer surface and free to rotate. In order to prevent over travel movement of the push rod, the aperture through which the retaining pin passes is of larger diameter than the diameter of the pin, so that while the push rod can move, its movement in both directions is limited. This then limits the amount of deflection which can be imparted to the closure zone of the diaphragm of the pilot valve.

Another problem which it is conceived could develop is the build up of debris from very poor quality water, such as underground water, between the sliding surfaces of the bush which carries the float and the depending stem, and to avoid large surface contact areas, either the internal surface of the bush or the external surface of the stem can be multi-faceted to give only line contact, not full area contact. Still further debris which does collect needs to be discharged as soon as possible, and in an embodiment of the invention as described above, the lower end of the stem can be provided with outstanding abutments ensuring that there is a flushing space between the lower end of the bush and the lower end of the stem on which it slides.

Claims defining the invention are as follows:

1. A stop valve to terminate the flow of liquid on the liquid passing from an inlet of the stop valve, through a valve seat, to an outlet discharging the liquid to a container, said stop valve terminating the flow on the liquid reaching a predetermined level in the container, said stop valve including a master valve diaphragm seatable on the valve seat to control the flow of liquid from the inlet to the outlet, said master valve diaphragm being controlled by a pilot valve diaphragm controlled by liquid level sensing means on the liquid passing through the stop valve into the container, wherein the master valve diaphragm and the pilot valve diaphragm enclose a common chamber when seated, and wherein the master valve diaphragm has a bleed from said inlet to apply inlet pressure to the common chamber when the master valve is seated to directly seat the pilot valve diaphragm against a second seat, and said liquid level sensing means includes a float and pushing means operatively connected between the float and said pilot diaphragm valve and extending through the second seat to directly unseat said pilot valve diaphragm in response to a low liquid level in said container to relieve pressure within the common chamber through at least one aperture in the pilot valve diaphragm and around at least a part of the pushing means and through the second valve seat.

2. A stop valve as defined in claim 1 wherein the pilot valve diaphragm has a central closure zone adapted to seal on an aperture, and including a push rod passing through the aperture and being operatively connected to said float, said pilot valve diaphragm having a plurality of circumferentially spaced apertures spaced radially from said closure zone, said spaced apertures being connected by bridges, whereby in the unseated position of the pilot valve diaphragm liquid passes through the bleed in the master diaphragm and through the spaced apertures in the pilot valve diaphragm and said aperture, the flow of the liquid bleed assisting in removing debris from the closure zone and the aperture.

3. A stop valve as defined in claim 2 wherein to terminate the flow through the stop valve, the float moves the push rod to seat the pilot valve diaphragm on the aperture, whereby bleed through the master valve diaphragm increases pressure on the master valve diaphragm to close the master valve diaphragm on the valve seat and terminate the flow through the stop valve, said bridges assisting the central closure zone sealing said aperture.

4. A stop valve as defined in any one of claims 1 to 3, wherein the pilot valve diaphragm is mounted in a pilot valve body, said body having a downwardly facing internal surface, a plurality of downwardly facing cavities in said surface, whereby air or a cushioning material in said cavities dampens and cushions the liquid acting on the pilot valve diaphragm thus smoothing the seating of the pilot valve diaphragm.

5. A stop valve as defined in claim 1 wherein the float is mounted on a bush slidable on a stem and connected by a linkage mechanism to a push rod for unseating the pilot valve diaphragm, the stem being non-circular to facilitate flushing debris therefrom, and having a stop thereon to limit movement of the bush on the stem, and a casing surrounding the float and linkage to protect the float and linkage, at least one restricted opening in the casing to permit liquid to flow therethrough so that surge and wave action of the liquid does not adversely effect the float.

6. A stop valve to terminate the flow of liquid to a container on the level of the liquid reaching a predetermined level in the container, said stop valve including a master valve diaphragm controlling the flow of liquid into said container, a float responsive to the level of the liquid in the container, and a pilot valve diaphragm responsive to the position of the float to permit or terminate a bleed through a bleed aperture depending on whether the pilot valve diaphragm is unseated or seated on the bleed aperture, wherein the master valve diaphragm and the pilot valve diaphragm enclose a common chamber when seated, the master valve diaphragm having a bleed orifice therethrough to expose the common chamber to inlet pressure when the master valve diaphragm is seated and thus be responsive to the position of the pilot valve diaphragm, whereby when the pilot valve diaphragm closes the bleed aperture under inlet pressure, the bleed through the bleed orifice in the master valve diaphragm increases pressure in the common chamber to close the master valve diaphragm on a seat opening to the container, and when the float unseats the pilot valve diaphragm to open the bleed aperture, the pressure in the common chamber is relieved through at least one opening in the pilot valve diaphragm and the bleed aperture, and the master valve diaphragm opens from the seat due to inlet pressure acting on the master valve diaphragm outside of the common chamber.

7. A stop valve as defined in claim 6 including a linkage mechanism between the float and the pilot valve diaphragm, said linkage mechanism including a push rod passing through said bleed aperture to act on a sealing zone of said pilot valve diaphragm and unseat said sealing zone from said bleed aperture.

8. A stop valve as defined in claim 7 characterised by a plurality of circumferentially spaced apertures in said pilot valve diaphragm radially outwardly of said sealing zone and inwardly of an outer portion of said pilot valve diaphragm through which bleed flows to the bleed aperture when the push rod raises the sealing zone from the aperture.

9. A stop valve as defined in claim 7 wherein said push rod is multi-faceted to minimise debris accumulation and provide flushing of any accumulated debris by the passage of bleed flow there through.

10. A stop valve as defined in claim 7 wherein the float acts directly on the push rod, the body of the stop valve being cylindrical and the float is axially positioned on the stop valve.

11. A stop valve as defined in claim 10 characterised in that the stop valve is positioned in a cistern, the outlet of the stop valve extending upwardly, a deflector tube surrounding said outlet, and an anti-siphon check valve at the end of said outlet within said deflector tube to prevent siphoning and reduce noise.

\* \* \* \* \*